(12) United States Patent
Bruelle-Drews

(10) Patent No.: US 7,477,970 B2
(45) Date of Patent: Jan. 13, 2009

(54) VEHICLE CONTROL SYSTEM

(75) Inventor: Christian Bruelle-Drews, Hamburg (DE)

(73) Assignee: Harman Becker Automotive Systems GmbH, Northridge, CA (US)

( * ) Notice: Subject to any disclaimer, the term of this patent is extended or adjusted under 35 U.S.C. 154(b) by 188 days.

(21) Appl. No.: 11/206,666

(22) Filed: Aug. 18, 2005

(65) Prior Publication Data

US 2006/0038447 A1  Feb. 23, 2006

Related U.S. Application Data

(63) Continuation-in-part of application No. PCT/EP03/01627, filed on Feb. 18, 2003.

(51) Int. Cl.
*G06F 7/00* (2006.01)
(52) U.S. Cl. .................. 701/36; 701/33; 307/10.1
(58) Field of Classification Search .............. 701/30, 701/33, 36; 307/9.1, 10.1
See application file for complete search history.

(56) References Cited

U.S. PATENT DOCUMENTS

| 5,808,374 A | 9/1998 | Miller et al. ............... 307/10.1 |
| 2002/0022453 A1 | 2/2002 | Balog et al. .................. 455/41 |
| 2002/0096572 A1 | 7/2002 | Chene et al. .................. 236/62 |
| 2003/0093199 A1* | 5/2003 | Mavreas ....................... 701/33 |

FOREIGN PATENT DOCUMENTS

| DE | 3609688 | 3/1986 |
| EP | 0505336 | 3/1992 |
| FR | 2696384 | 4/1994 |
| JP | 61-0211842 | 6/1986 |
| WO | WO 01/87664 | 11/2001 |

OTHER PUBLICATIONS

M. Smith, Netscape Communications Corp; F. Dawson, Lotus Development Corporation; "A MIME Content-Type for Directory Information"; Sep. 1998.

F. Dawson, Lotus Development Corporation; T. Howes, Netscape Communications; "vCard MIME Profile"; Sep. 1998.

International Business Machines Corp., Lucent Technologies, Inc. and Siemens; vCard The Electronic Business Card a versit Consortium specification; Sep. 18, 1996.

* cited by examiner

*Primary Examiner*—Gertrude Arthur Jeanglaud
(74) *Attorney, Agent, or Firm*—The Eclipse Group LLP

(57) ABSTRACT

A vehicle control system of a vehicle configured to communicate with an external device, such as a portable digital assistant or mobile phone for the purpose of sending and receiving external data regarding a user's personal settings for vehicle components. As an example, the user data may correspond to the position of the driver's seat. The user data may be retrieved from the external device and transferred to the vehicle control system of a second vehicle to configure the second vehicle to the user's personal settings. The user data may be, as and example, transferred using the vCard data format for personal data interchange.

27 Claims, 4 Drawing Sheets

VEHICLE CONTROL SYSTEM

CROSS REFERENCE TO RELATED APPLICATIONS

This application is a continuation-in-part of and claims priority of International Patent Application Serial No. PCT/EP2003/001627, filed Feb. 18, 2003, titled VEHICLE CONTROL SYSTEM, by inventor Christian Brulle-Drews, the entirety of which is incorporated by reference into this application.

BACKGROUND OF THE INVENTION

1. Field of the Invention

This invention relates generally to control systems for vehicles.

2. Related Art

Modern vehicles, and in particular luxury cars, may include on-board systems having programmable user settings. As an example, the driver's seat of a vehicle often has multiple controls that allow the user to set the seat's horizontal position, height, inclination, degree of lumbar support, temperature, etc. As another example, the audio system of a vehicle may include numerous settings that a user may adjust, such as the volume, balance, equalization profile, selection of radio stations, traffic information settings, etc. As a further example, the heating and air conditioning systems may also include various settings adjustable by a user.

A driver of a vehicle may invest a lot of time and effort adjusting a vehicle's settings to his or her personal preferences to provide an optimum driving experience. Unfortunately, these personal settings may be lost when the vehicle is driven by others. The loss of a driver's personal settings and adjustments may be an annoyance to a driver who must continually re-adjust a vehicle's settings to meet the driver's personal needs and/or desires. Furthermore, if a driver does not adjust the vehicle's settings before driving, he can be tempted to make adjustments while driving, which may reduce his level of concentration below a safe level.

On-board systems of many modern vehicles are controlled electronically by a central controller in the form of an on-board computer that distributes data to the vehicle's components via a vehicle data bus. Several of these systems are capable of storing the personal settings of particular drivers in an on-board computer so that a driver may recall his/her personal settings before driving. When settings are recalled, a vehicle's on-board control system may automatically be adjusted to conform to the saved personal settings of a particular driver. One method of recalling the settings may include providing the vehicle with several uniquely identifiable keys, each of which belongs to a different distinct driver/user. When an identifiable key is inserted in the vehicle's ignition or door handle, the vehicle's control system recognizes the key as being associated with stored settings and adjusts the vehicle settings to correspond to those associated with the uniquely identifiable key. Another method of recalling personal settings may include prompting the user to enter a personal identification number (PIN) on a keypad controlled by the vehicle control system. In all these methods, the personal settings of the driver are stored in the vehicle's control system.

Such on-board control systems may operate satisfactorily when a vehicle has a small number of regular users. As an example, the same vehicle may be utilized by several members of a family. However, in the case of vehicles for hire, e.g., rental cars, or company fleet cars, where a particular user may never drive the same car twice, such a system may be impractical. Accordingly, a need exists for a system that allows for a vehicle control system to communicate with a user device to allow the control system to record personal settings for the user device and to adjust vehicle settings based upon personal setting information stored for the user. In this manner, vehicles for hire, company fleet vehicles or other similarly used vehicles can automatically adjust to conform to the personal settings of any driver.

SUMMARY

A vehicle control system for a vehicle is provided that may be configured to communicate with an external device, such as a portable digital assistant (PDA), a mobile phone, or an external server to record and/or retrieve user data relating to preferential vehicle settings of one or more users/drivers.

The user data may correspond to a value of a user-programmable setting of a component of the vehicle, such as a seat, rear or side mirrors, audio system, heating/cooling units, and etc. For example, the user data may correspond to a particular driver seat position, ambient temperature, radio station, audio system volume, or etc.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
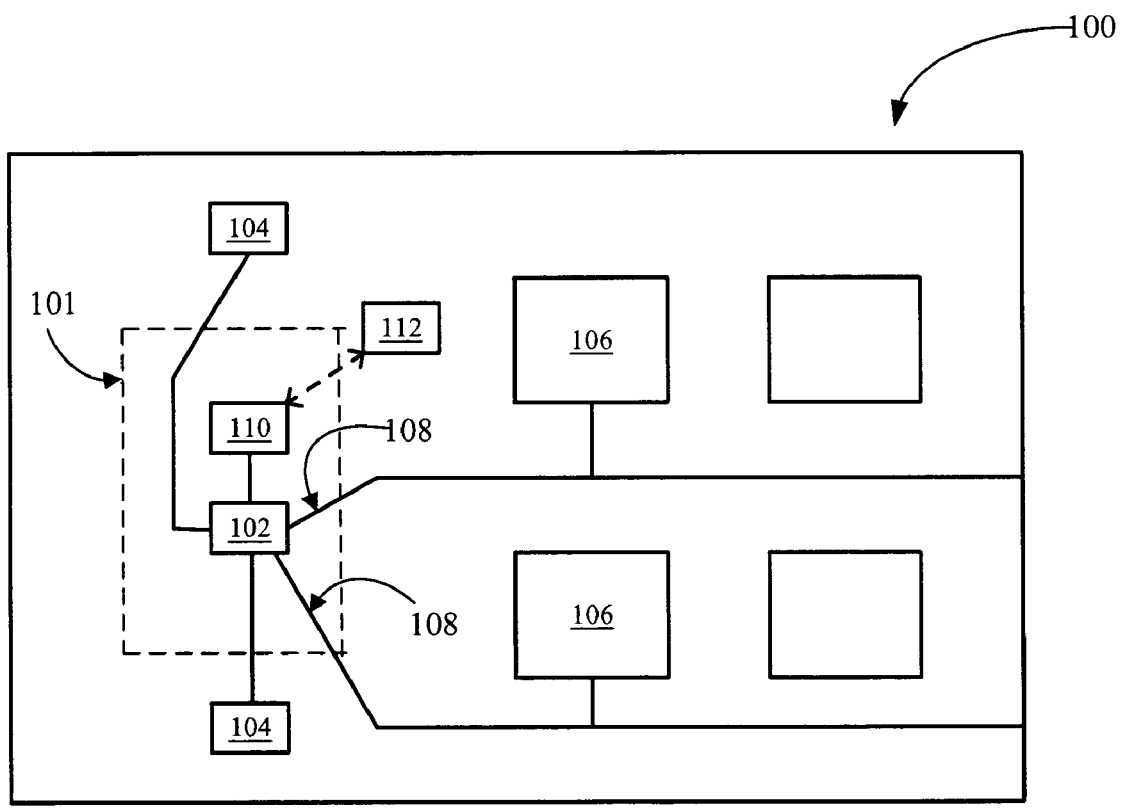
FIG. 1 illustrates a schematic representation of one example of one implementation of a vehicle 100 having a vehicle control system including a controller 102.

FIG. 1 illustrates a schematic representation of one example of one implementation of a vehicle 100 having a vehicle control system including a controller 102. While the controller 102 may be utilized in connection with any type of vehicle 100, for illustration purposes, FIG. 1 shows the vehicle 100 in the form of a car. As examples of other vehicles, vans, trucks, and buses may be utilized.

The vehicle 100 may also include an audio system 104 and seats 106, all of which may be adjustable through the controller 102. The vehicle 100 may also include other adjustable components with user-programmable settings, such as a heating and cooling system, mirrors and a navigation system, but for the sake of simplicity, only a few select components are illustrated in FIG. 1.

The controller 102 may communicate with the audio system 104, the seats 106 and other programmable components via an internal data communication device 108, which may transmit data to the components regarding their required settings. As examples, the internal data communication device 108 may transmit data by a wired or wireless link. In an example of an implementation, a user may be able to utilize the vehicle control system 101 to control a television or a digital video disk (DVD) player located in the vehicle 100 using the vehicle control system 101. The user preference could be to turn the television on to CNN at a certain volume, or to MTV, etc.

The controller 102 may also be equipped with an external interface 110 for sending and receiving data to and from an external device 112, such as a cell phone, personal digital assistant (PDA), or other device capable of storing data, acquiring data and/or forwarding such data for storage elsewhere. As examples, the external interface 110 may be a wired, infra-red or BLUETOOTH interface, or a smart card reader or other device that provides for data to be obtained from magnetic media or by scanning information. Examples of wired external interfaces may include parallel ports, serial ports, USB, and other known data transfer interfaces. In one example of one implementation, a user's personal preference information may not be stored in whole or part on the external device 112 but instead be found as a personal file on the Internet or a remote server accessible via the external device 112.

Commonly, PDAs are utilized to retain at least calendar information and directory information (names, addresses, telephone numbers, etc.). Many mobile phones include at least some of the functionality of a PDA and, indeed, some PDAs are able to operate as mobile phones. Among the advantages of utilizing a PDA, a laptop computer or a mobile phone as the external device 112 are that a user is not required to purchase a dedicated external data storage device, and the user is likely to keep a PDA or mobile phone with them substantially all of the time. It is therefore unnecessary for the user to remember to carry a dedicated external data storage device for storing his desired vehicle settings.

In one example of one implementation, the vehicle control system 1101 may be designed such that all the components of the system are located in the vehicle 100. In an alternative implementation, the control system may include certain components that are located remotely from the vehicle 100. As an example, the control system via that controller 102 may send and/or receive information from remote storage devices such as a server or via the Internet through a wireless connection.

As an example, when a user gets into the vehicle 100, he sets the position of the driving seat 106. Before the user leaves the vehicle 100, the position of the seat 106 may communicated to the user's external device 112, where it may be stored on the external device 112 or forwarded to a server to be stored remotely. Subsequently, when the user returns to the vehicle 100 or to another vehicle equipped with a vehicle control system 101, the stored position for the seat 106 may be communicated by the external device 112 to the controller 102 and the position of the seat 106 may be automatically set to the position desired by the user. In this way, every vehicle 100 that the user drives and that is equipped with a vehicle control system 101 may be automatically set to the user's desired configuration by reading data accessible from or through the user's external device 112. For drivers who regularly use a large number of different vehicles, a vehicle control system 101 may be a great advantage in reducing the amount of time and effort spent adjusting the on-board systems of a vehicle. As an example, a vehicle control system 101 may be utilized with vehicles for hire or vehicles from a company vehicle pool. Furthermore, driving safety may be enhanced because the user is not distracted from driving by a badly adjusted seat as an example, and tempted to adjust the seat position while driving.

Figure 2:
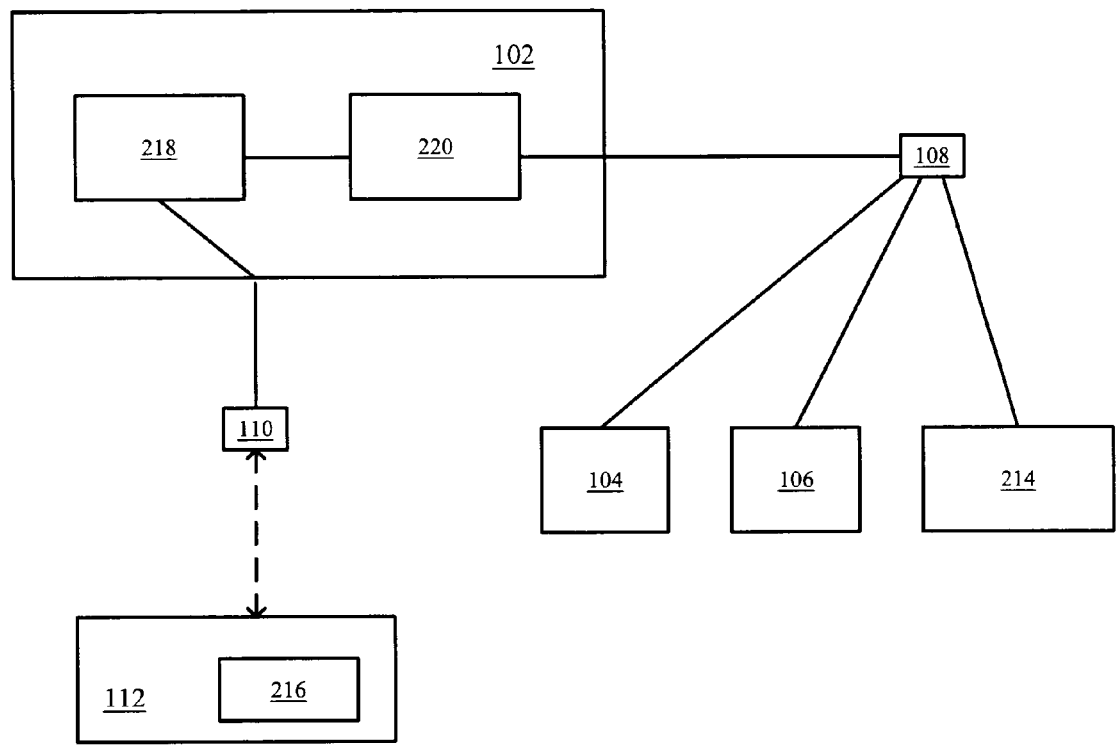
FIG. 2 illustrates a schematic representation of one example of one embodiment of the controller 102 and several components in data communication with the controller 102, as illustrated in FIG. 1.

FIG. 2 illustrates a schematic representation of one example of one embodiment of the controller 102 and several components in data communication with the controller 102, as illustrated in FIG. 1. As shown in FIG. 2, the controller 102 may be capable of communicating with the audio system 104 and the seats 106 via the internal data communication device 108. Further, programmable components may include additional functional units 214 that may also be in data communication with the controller 102 via the internal data communication device 108, such as a heating/cooling system, rear windows, side windows, among other things.

The controller 102 is also able to communicate with the external device 112, such as a PDA, via the external interface 110. In an example of an implementation, a user may provide the external device 112 with information regarding the user's height, inseam, shoe size, shoe sole size, arm length, preferred temperature, favorite radio station, audio volume preference and etc. From this data, which is then received by the controller 102, the vehicle 100 may adjust vehicle components to fit standard preferences of a user based upon the user's personal data. As examples, the external interface 110 may be a wired interface or an infra-red or BLUETOOTH interface, or another element for transmitting data.

It is desirable for the user data to be communicated between the controller 102 and the external device 112 in a standard data format. In this way, the external device 112 may receive the user data without requiring prior compatibility with the specification of a dedicated data format. This standardization reduces the configuration required for an external device to be utilized. The external device 112, such as a PDA, may be compatible with the vCard standard for the transfer of directory information, such as the name, address and telephone number of a person. Thus, the external device 112 may include software 216 that is capable of receiving, storing, retrieving and sending data in the vCard format.

The vCard format is used for the exchange of address data by numerous PC, PDA and mobile phone applications and in the Internet. The vCard standard is defined in "vCard The Electronic Business Card Version 2.1", a versit Consortium Specification, 18 Sep. 1996, and includes the optional parameter type "Profile" with the key/x that is intended for the storage of application-dependent or experimental information. Personal settings for the vehicle, such as seat position, steering wheel position, gear configuration and audio settings, may be collectively stored in the controller 102 and transferred to a laptop computer, PDA, mobile phone or other similar external device via an external interface 110 using the vCard format. The transferred data may be retrieved subsequently from the external device 112 to the controller 102 of the same vehicle or of a different vehicle. Thus, when the user changes vehicles, the user may reproduce his driving position as well as other settings both quickly and easily.

The controller 102 may include interpreter software 218 capable of sending and receiving data in the vCard format. Data corresponding to the current settings of the vehicle's systems may be sent to the external device 112 in the vCard format. The personal settings may be stored as an extension in the vCard format. An extension field may be utilized for each user-definable setting. An example of an implementation of data in the vCard format including an extension for the x and y position of the driver's seat is set out below with explanatory comments.

```
BEGIN: VCARD           Begin data set
VERSION: 2.1           vCard version
X-SEAT; X = 2299;      vcard extension for x and y position of seat
Y = 3994
BEGIN: VCARD           Begin subset
N: Audi A6 settings    Indicator in place of a name
END: VCARD             End subset
END: VCARD             End data set
```

When the above vCard data is received by the external device 112 it may appear as an entry in the address book of the device with a name, such as, "Audi A6 settings". In this example, the data may be dependent on the make and model of the vehicle.

The controller 102 may also include converter software 220 that converts the settings of the vehicle's components 104, 106, and 214 to data that is independent of the particular make and model of the vehicle 100. The model-independent data may be communicated to the external device 112 in vCard format. Model-independent data received from the external device 112 via the external interface 110 may be decoded from the vCard format by the interpreter software 218 and converted to settings for the components 104, 106, and 214 of the vehicle 100 by the converter software 220. The converted settings may then be communicated to the relevant components 104, 106 and 214 via the internal data communication device 108.

In one example of one implementation, the user data includes information that can be utilized independent of the permanent configuration of a particular vehicle 100. In this way, user data received by an external device 112 of a first vehicle 100 may be sent to the vehicle control system 101 of a second vehicle, and utilized by that vehicle control system 101 to configure the on-board systems of the second vehicle in the same way as that of the first vehicle 100, even though the two vehicles may have different permanent configurations. As an example, the user data may include a value for the horizontal position of the driver's seat in terms of a distance from the clutch pedal to the base of the back rest. For any model of vehicle, this distance may be converted to a parameter value for the horizontal position of the driver's seat in order to achieve the desired distance. Consequently, when the user moves from one model of vehicle to another, from the user's point of view, the position of the seat should be the same.

Figure 3:
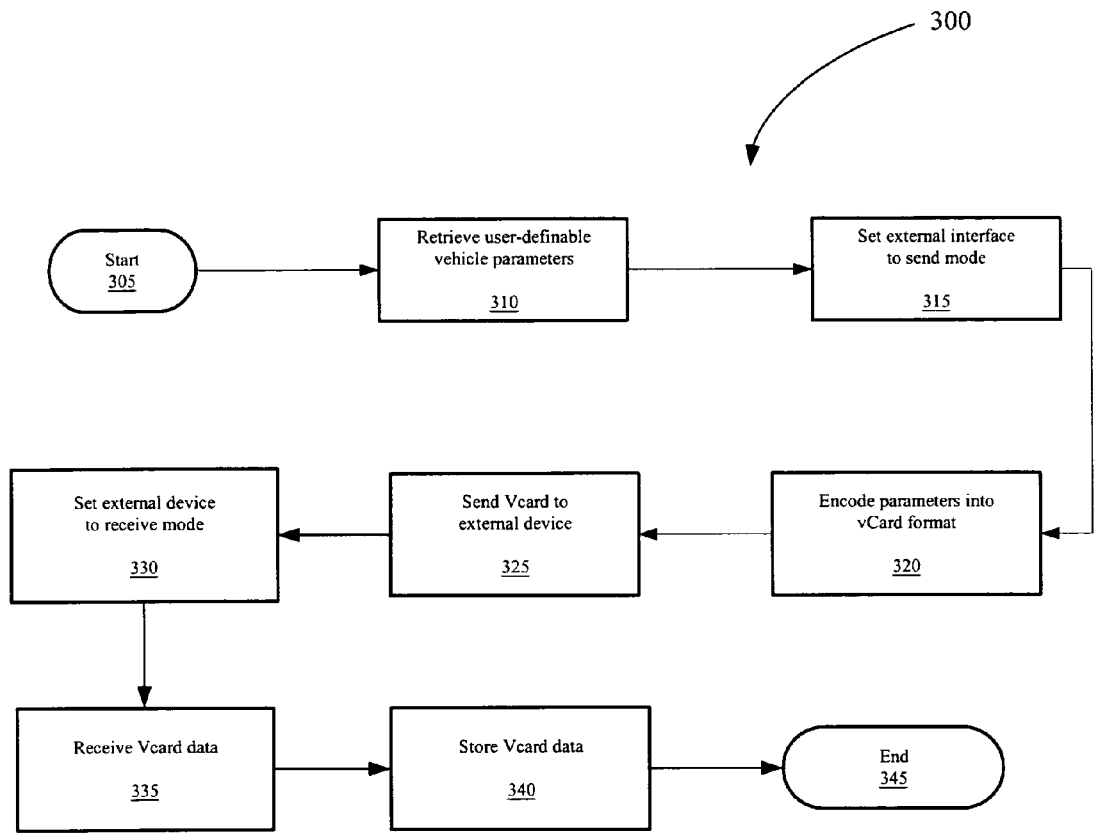
FIG. 3 illustrates one example of one process 300 for transferring user settings from the controller 102 of the vehicle 100 (FIG. 1) to an external device 112 (FIG. 2).

FIG. 3 illustrates one example of one process 300 for transferring user settings from the controller 102 of the vehicle 100 (FIG. 1) to the external device 112 (FIG. 2). The process 300 starts at step 305. Then, at step 310, the controller 102 retrieves the values of the user-definable parameters of the vehicle 100. This retrieval may be done simply by retrieving the values from memory or by polling the relevant components of the vehicle 100, depending on the configuration of the controller 102. In step 315, the external interface 110 may then be set to send mode and at step 320 the retrieved parameters may be encoded into a vCard format, as set out above. The vCard data may then be sent from the controller 102 to the external device 112 via the external interface 110 at step 325. In the meantime, the external device 112 is set to receive mode at step 330. The received vCard data is then received at step 335 and may be stored by the external device 112 or forwarded elsewhere by the external device 112 at step 340. The process then ends at step 345.

Figure 4:
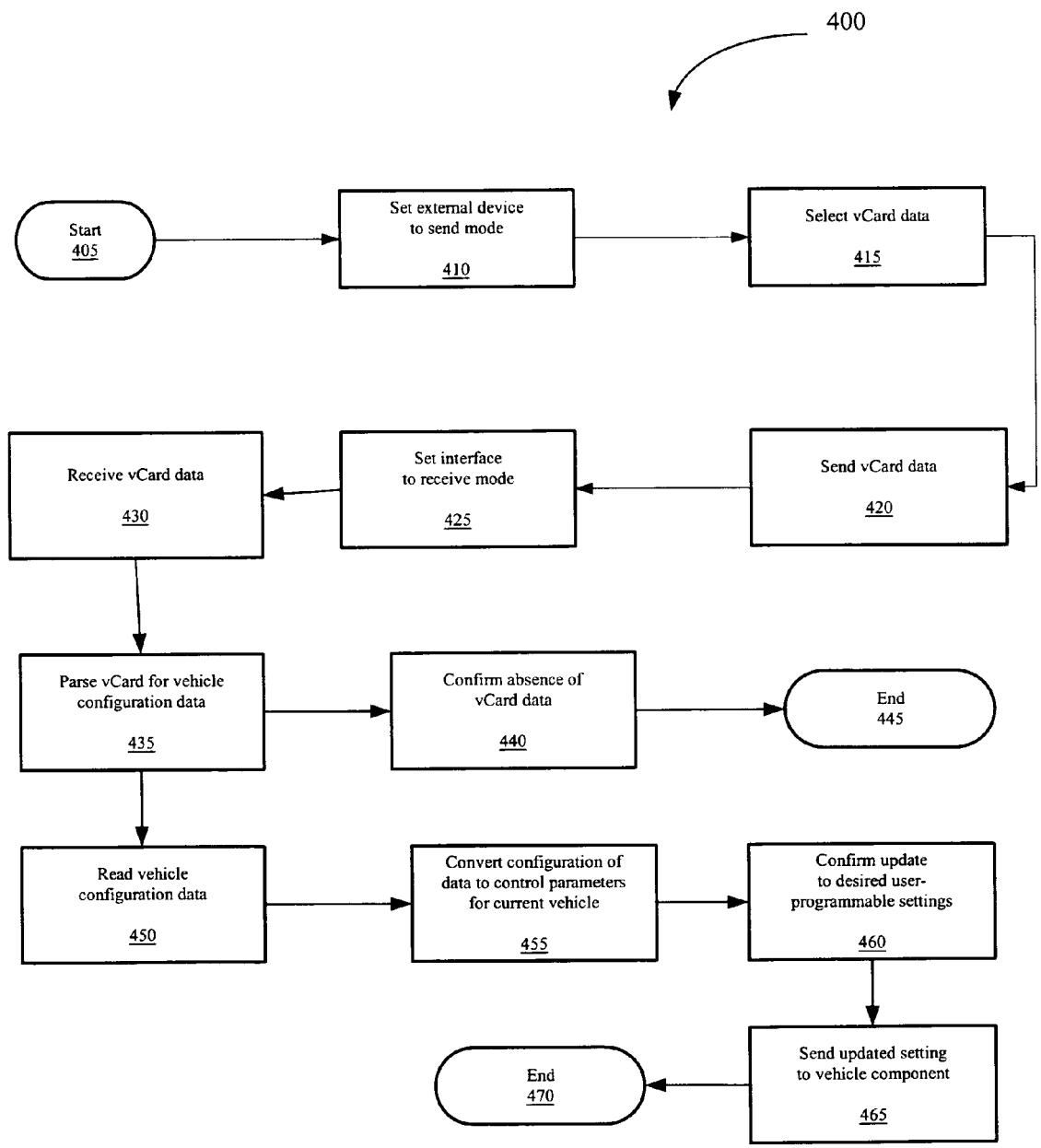
FIG. 4 illustrates an example of one process 400 for retrieving user settings from the external device 112 to the controller 102 of the vehicle 100.

FIG. 4 illustrates an example of one process 400 for retrieving user settings from the external device 112 to the controller 102 of the vehicle 100. The process 400 begins at step 405. At step 410, the external device 112 may be set to send mode and at step 415 the vCard data corresponding to the desired set of stored vehicle parameters may be selected from the vCard address directory of the external device 112 by the user. In the example set out above, the user might select the item "Audi A6 settings". The vCard data may then be sent from the external device 112 at step 420 to the controller 102 via the external interface 110. In the meantime, at step 425, the external interface 110 may be set to receive mode so that it is ready to receive address book data. At step 430, the interpreter software 218 of the controller 102 receives vCard data, and at step 435 may parse the received vCard data for extension fields that correspond to vehicle configuration data. At step 440, the absence of vehicle configuration vCard data fields may be confirmed. If no such fields are found, the process ends at step 445. If the received vCard data includes vehicle configuration data, the interpreter software 218 reads the vehicle configuration data at step 450 to the converter software 220. The converter software 220 converts the vehicle configuration data at step 455 to control parameters for the vehicle 100. The controller 102 may request confirmation at step 460 from the user that the received settings should replace the current vehicle settings. When confirmation is received, the control parameters may be sent via the internal data communication device 108 at step 465 to the relevant components 104, 106, and 214 of the vehicle 100. As an example, the control parameters may be sent to the driver's seat 106 (FIG. 1). The process then ends at step 470.

In summary, the vehicle control system 101 may include a controller 102, an internal data communication device 108 and a external interface device 110 among other components and may be configured to communicate user data via an external device 112, such as a portable digital assistant (PDA) or mobile phone via a wireless link. The user data may correspond to the user's personal settings for the vehicle. As an example, the user data may correspond to the position of the driver's seat. The user data may be retrieved from the external device 112 and transferred to the controller 102 of another vehicle to configure the second vehicle to the user's personal settings. The user data may be transferred using a vCard data format, or other known format for personal data interchange. The controller 102 may incorporate utilization of existing technology and formats to allow a user to easily transfer their personal vehicle settings from one vehicle to another.

Persons skilled in the art will understand and appreciate, that one or more processes, sub-processes, or process steps described in connection with FIGS. 1 through 4 may be performed by hardware and/or software. Additionally, the vehicle control system 101 may be implemented completely in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions (i.e., "logic" that may be implemented either in digital form such as digital circuitry or source code or optical circuitry or chemical or biochemical in analog form such as analog circuitry or an analog source such an analog electrical, sound or video signal), and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (herein known as a "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer (i.e., machine) data signals embodied in the carrier wave signal. The computer/machine data signals may include data or software that is transported or interacts with the carrier wave signal.

Although the invention has been described with reference to a particular example of an embodiment, it will be apparent to those skilled in the art that various changes and modifications may be made without departing from the spirit and scope of the invention. Such changes and modification are intended to be covered by the appended claims.

What is claimed is:

1. A vehicle control system for communicating user data corresponding to a value of a user-programmable setting of at least one vehicle component, the vehicle control system comprising:
   a controller for controlling the at least one vehicle component;
   an internal data communication device for communicating the user data; and
   an external interface for communicating with an external device;
   where the controller is configured to send the user data to the external device via the external interface;
   where the controller is configured to receive the user data from the external device via the external interface; and
   where the controller is configured to communicate the user data via the internal data communication device to the vehicle component.

2. The apparatus of claim 1, in which the user data includes a value of a user-programmable setting.

3. The apparatus of claim 1, in which the user data includes user personal data.

4. The apparatus of claim 1, in which the external device and the controller are configured to mutually accept a standardized data format.

5. The apparatus of claim 4, in which the external device and the controller each are configured to accept the user data in a vCard format.

6. The apparatus of claim 1, in which the controller is configured to convert the user data corresponding to a value of a user-programmable setting of the vehicle component into a model-independent data format.

7. The apparatus of claim 6, in which the controller is configured to utilize user personal data and model-independent data to communicate the user data to the vehicle component.

8. The apparatus of claim 6, in which the controller is configured to convert the model-independent data into vehicle make- and model-dependent data.

9. The apparatus of claim 1, in which the external interface is wireless.

10. A method of controlling a vehicle component, comprising:
    receiving user data corresponding to a value of a user-programmable setting of the vehicle component at a controller from the vehicle component via an internal data communication device;
    sending the user data from the controller via an external interface to an external device;
    receiving the user data at the controller via the external interface from the external device; and
    utilizing the user data at the controller to communicate data corresponding to a value of a user-programmable setting via the internal data communication device to the vehicle component.

11. The method of claim 10, in which receiving the user data includes receiving a value of a user-programmable setting.

12. The method of claim 10, in which receiving the user data includes receiving user personal data.

13. The method of claim 10, including sending and receiving the user data formatted in a standardized data format.

14. The method of claim 13, including sending and receiving the user data formatted in a vCard standardized data format.

15. The method of claim 10, in which receiving the user data from the vehicle component includes converting the user data into a model-independent data format.

16. The method of claim 10, in which communicating the user data to the vehicle component includes utilizing user personal data and model-independent data to communicate the user data to the vehicle component.

17. The method of claim 10, in which sending the user data from the controller via an external interface to an external device includes converting make- and model-dependent data into model-independent data.

18. The method of claim 10, including wirelessly sending the user data from the controller via the external interface to the external device.

19. A computer readable medium having a plurality of instructions for controlling a vehicle component, the plurality of instructions comprising:
    a plurality of instructions for receiving user data corresponding to a value of a user-programmable setting of the vehicle component at a controller from the vehicle component via an internal data communication device;

a plurality of instructions for sending the user data from the controller via an external interface to an external device;

a plurality of instructions for receiving the user data at the controller via the external interface from the external device; and a plurality of instructions for utilizing the user data at the controller to communicate the user data via the internal data communication device to the vehicle component.

20. The computer readable medium of claim 19, in which the plurality of instructions for receiving the user data includes a plurality of instructions for receiving a value of a user-programmable setting.

21. The computer readable medium of claim 19, in which the plurality of instructions for receiving the user data includes a plurality of instructions for receiving user personal data.

22. The computer readable medium of claim 19, in which the plurality of instructions for sending and receiving the user data includes a plurality of instructions for formatting the user data in a standardized data format.

23. The computer readable medium of claim 22, in which the plurality of instructions for sending and receiving the user data includes a plurality of instructions for formatting the user data in a vCard standardized data format.

24. The computer readable medium of claim 19, in which the plurality of instructions for receiving the user data from the vehicle component includes a plurality of instructions for converting the user data into a model-independent data format.

25. The computer readable medium of claim 19, in which the plurality of instructions for communicating the user data to the vehicle component includes a plurality of instructions for utilizing user personal data and model-independent data to communicate the user data to the vehicle component.

26. The computer readable medium of claim 19, in which the plurality of instructions for sending the user data from the controller via an external interface to an external device includes a plurality of instructions for converting make- and model-dependent data into model-independent data.

27. The computer readable medium of claim 19, including a plurality of instructions for wirelessly sending the user data from the controller via the external interface to the external device.

* * * * *